(12) United States Patent
Malatesha et al.

(10) Patent No.: US 10,284,609 B2
(45) Date of Patent: May 7, 2019

(54) MULTIFUNCTION COLLABORATION WITHIN AN ELECTRONIC MEETING

(71) Applicants: Rathnakara Malatesha, Sunnyvale, CA (US); Lana Wong, Belleville, NJ (US); Hiroshi Kitada, Tuckahoe, NY (US)

(72) Inventors: Rathnakara Malatesha, Sunnyvale, CA (US); Lana Wong, Belleville, NJ (US); Hiroshi Kitada, Tuckahoe, NY (US)

(73) Assignee: RICOH COMPANY, LTD., Tokyo (JP)

( * ) Notice: Subject to any disclaimer, the term of this patent is extended or adjusted under 35 U.S.C. 154(b) by 281 days.

(21) Appl. No.: 15/197,502

(22) Filed: Jun. 29, 2016

(65) Prior Publication Data

US 2018/0007098 A1    Jan. 4, 2018

(51) Int. Cl.
  *H04L 29/06*    (2006.01)
  *H04L 12/911*    (2013.01)
(52) U.S. Cl.
  CPC ............ *H04L 65/403* (2013.01); *H04L 47/70* (2013.01); *H04L 65/4015* (2013.01)
(58) Field of Classification Search
  CPC .............................. H04L 65/403; H04L 47/70
  See application file for complete search history.

(56) References Cited

U.S. PATENT DOCUMENTS

| | | | | |
|---|---|---|---|---|
| 2004/0107249 A1* | 6/2004 | Moser | .................. | G06Q 10/107 709/204 |
| 2009/0327425 A1* | 12/2009 | Gudipaty | ............... | H04N 7/147 709/205 |
| 2010/0146499 A1* | 6/2010 | Bush | ..................... | G06F 21/604 717/178 |
| 2011/0023096 A1* | 1/2011 | Xiao | .................... | H04L 63/0236 726/5 |
| 2012/0154516 A1* | 6/2012 | Niu | ........................ | H04N 7/147 348/14.09 |
| 2018/0007097 A1 | 1/2018 | Malatesha | | |

OTHER PUBLICATIONS

Malatesha, U.S. Appl. No. 15/197,455, filed Jun. 29, 2016, Final Office Action, dated Oct. 5, 2018.

* cited by examiner

*Primary Examiner* — Michael A Keller
(74) *Attorney, Agent, or Firm* — Hickman Palermo Becker Bingham LLP; Edward A. Becker

(57) ABSTRACT

Techniques provided for a computing device to determine device capabilities and privileges of the computing device to enable privileges for one or more meeting windows displayed on the computing device within an electronic meeting. The computing device determines the capability of the computing device with respect to a first meeting window containing first content and a second meeting window containing second content. The computing device determines that the computing device has a first level role that includes privileges to control the first content contained in the first meeting window. The computing device determines that the computing device has a second level role for the second meeting window that includes privileges to view, but not control, the second content contained in the second meeting window. The computing device enables privileges to allow control of the first content and to allow viewing, but not control, of the second content.

20 Claims, 7 Drawing Sheets

FIG. 4

405 Client Device Table

| ROW | Device Type | Device ID | IP | MAC Address | Capabilities |
|---|---|---|---|---|---|
| 1 | Whiteboard | WHITEBOARD_CAMPBELL_01 | 1.2.3.4 | 11.22.33.44.55.66 | Annotation, Audio, Video, Chat |
| 2 | Whiteboard | WHITEBOARD_NJ_01 | 128.182.44.6 | 11.22.33.44.33.11 | Annotation, Audio, Video, Chat |
| 3 | Mobile Phone | MOBILE_001 | 192.168.4.1 | 11.11.33.11.55.11 | Audio, Video, Chat |
| 4 | PC | PC_RATHNA_01 | 192.168.152.1 | 11.22.33.77.88.99 | Audio, Video, Chat |
| 5 | PC | PC_SANJEEV_01 | 192.168.144.6 | 11.22.33.33.12.13 | Audio, Video, Chat |
| 6 | PC | MOBILE_222 | 192.158.103.130 | 44.11.33.55.55.77 | Audio, Video, Chat |

410 Meeting Table

| ROW | Meeting ID | Host Device ID | Participant Device ID |
|---|---|---|---|
| 1 | 123465 | WHITEBOARD_CAMPBELL_01 | WHITEBOARD_CAMPBELL_01 |
| 2 | 123465 | WHITEBOARD_CAMPBELL_01 | WHITEBOARD_NJ_01 |
| 3 | 123465 | WHITEBOARD_CAMPBELL_01 | MOBILE_001 |
| 4 | 123465 | WHITEBOARD_CAMPBELL_01 | PC_RATHNA_01 |
| 5 | 222390 | PC_SANJEEV_01 | PC_SANJEEV_01 |
| 6 | 222390 | PC_SANJEEV_01 | MOBILE_222 |

415 Role Table

| ROW | Meeting ID | Device ID | Role |
|---|---|---|---|
| 1 | 123465 | WHITEBOARD_CAMPBELL_01 | Meeting Host |
| 2 | 123465 | WHITEBOARD_NJ_01 | File Host |
| 3 | 123465 | WHITEBOARD_CAMPBELL_01 | Annotation Host |
| 4 | 123465 | PC_RATHNA_01 | App Host |
| 5 | 123465 | MOBILE_001 | Guest |

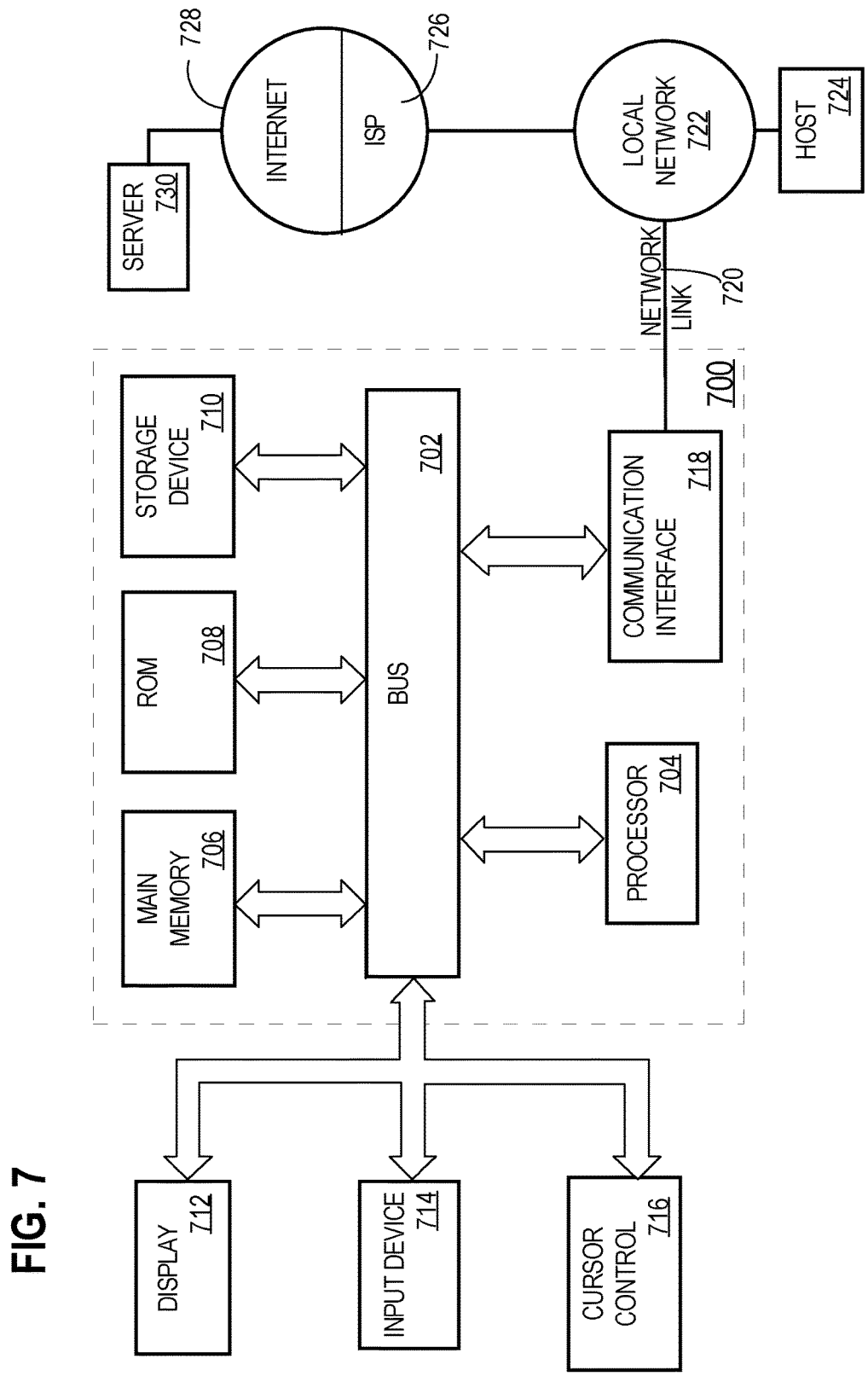

MULTIFUNCTION COLLABORATION WITHIN AN ELECTRONIC MEETING

RELATED APPLICATION DATA

This application is related to U.S. patent application Ser. No. 15/197,455 entitled "Multifunction Collaboration Within an Electronic Meeting", filed Jun. 29, 2016, the contents all of which are incorporated by reference in their entirety for all purposes as if fully set forth herein.

FIELD OF THE INVENTION

Embodiments relate generally to managing privileges for multiple windows and multiple users within an electronic meeting. SUGGESTED GROUP ART UNIT: 2425; SUGGESTED CLASSIFICATION: 725.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users of electronic meetings may utilize different electronic devices to connect to electronic meetings. Electronic meetings may include capabilities of presenting audio and video to users through their electronic device. Some electronic meetings may include functionality to actively collaborate with other meeting participants by allows different participants certain editing privileges for content within the electronic meeting. However, electronic meetings only allow a single user at a given time to have privileges to edit material presented within the electronic meeting. Therefore if two or more windows are visible to users of an electronic meeting, then only one user would have the privilege to edit content across the two or more windows displayed. In order for other users to edit content maintained in a window not currently edited by the first user, the first user would have to surrender edit control to another user in order for the other user to edit the desired content.

Additionally, the managing system running the electronic meeting streams available content to all users regardless of the capability of displaying the content on each user's device. For example, if a user only has audio capabilities, the electronic meeting management system would still stream the audio and video from the meeting to all users, thereby expending bandwidth in order to ensure each user receives the audio and video.

SUMMARY

Techniques are provided for a computing device to determine device capabilities and privileges of the computing device to enable privileges for one or more meeting windows displayed on the computing device within an electronic meeting. In an embodiment, the computing device determines the capability of the computing device with respect to a first meeting window containing first content and a second meeting window containing second content within an electronic meeting. The electronic meeting is a collaborative meeting between two or more computing devices concurrently displaying the first meeting window containing the first content and the second meeting window containing the second content on each of the two or more computing devices.

The computing device then determines that the computing device has a first level role that includes privileges to control the first content contained in the first meeting window of the electronic meeting. The computing device then determines that the computing device has a second level role for the second meeting window that includes privileges to view, but not control, the second content contained in the second meeting window of the electronic meeting.

The computing device then enables privileges on the computing device based upon the device capability with respect to the first meeting window and the determined first level role. The enabled privileges for the first meeting window allow control of the first content contained in the first meeting window of the electronic meeting. The computing device then enables privileges on the computing device based upon the device capability with respect to the second meeting window and the determined second level role. The enabled privileges for the second meeting window allow viewing, but not control, of the second content contained in the second meeting window of the electronic meeting. The second computing device of the two or more computing devices has privileges to view, but not control, the first content contained in the first meeting window of the electronic meeting and has privileges to control the second content contained in the second meeting window of the electronic meeting. Embodiments may be implemented by one or more computing devices, instructions stored on computer-readable media, and computer-implemented methods.

BRIEF DESCRIPTION OF THE DRAWINGS

In the figures of the accompanying drawings like reference numerals refer to similar elements.

FIG. 4 depicts example embodiments of data structures used to maintain records of available client devices.

FIG. 7 is a block diagram that depicts an example computer system upon which embodiments may be implemented.

DETAILED DESCRIPTION

Figure 1:
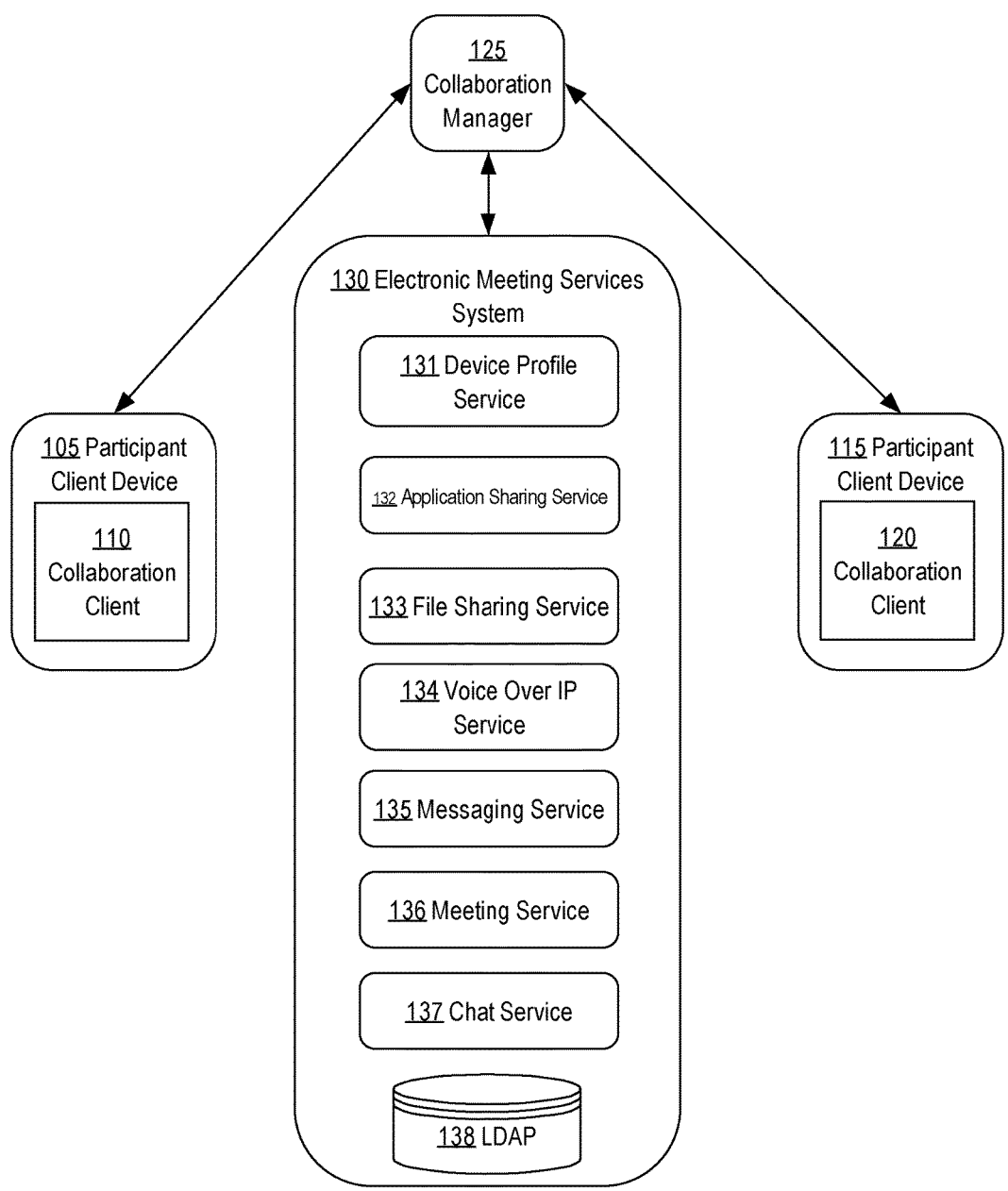
FIG. 1 is a block diagram that depicts an arrangement for managing multiple windows and multiple users within an electronic meeting.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

1. OVERVIEW
2. STRUCTURAL OVERVIEW
3. FUNCTIONAL OVERVIEW
3.1. COLLABORATION MANAGER
   3.1.1. INITIATING AND MAINTAINING ELECTRONIC MEETINGS
   3.1.2. RECEIVING A ROLE REQUEST FROM A PARTICIPANT
   3.1.3. ENABLING ROLES FOR PARTICIPANTS
3.2. COLLABORATION CLIENT
   3.2.1. DETERMINING CLIENT DEVICE CAPABILITIES
   3.2.2. DETERMINING CLIENT DEVICE ROLES
   3.2.3. ENABLING PRIVILEGES FOR MEETING WINDOWS
4. ROLE REQUESTS
5. IMPLEMENTATION MECHANISMS

1. Overview

An approach is provided for determining device capabilities and enabling privileges for one or more meeting windows within an electronic meeting displayed on a computing device. In an embodiment, a set of records of computing devices that are capable of participating in an electronic meeting and their associated functional capabilities are maintained by a system. Access permissions for the one or more meeting windows, within the electronic meeting, are maintained by the system. A first computing device determines the capability of the first computing device with respect to a first meeting window containing first content and a second meeting window containing second content within an electronic meeting for a collaborative meeting between two or more computing devices concurrently displaying the first meeting window and the second meeting window, where the system manages the control of the data displayed within the collaborative meeting.

The system manages different roles available for different types of actions. Each level role may define different levels of control for data within each meeting window and control of the entire electronic meeting itself. The system receives a request for a first level role, from the first computing device of the two or more computing devices in the electronic meeting. The request for a first level role includes a request for privileges to control the first content contained in the first meeting window of the electronic meeting. The system determines that the first computing device has, for the first meeting window, a first level role that includes privileges to control the first content contained in the first meeting window of the electronic meeting. The system then enables privileges, based upon the set of records of computing devices and the access permission roles for the one or more meeting windows within the electronic meeting, to allow control of the first content contained in the first meeting window of the electronic meeting to the first computing device. Content may include, but is not limited to, specific application content such as control of Annotation application, file content such as control over files displayed and edited within a meeting window, and meeting content such as data displaying details of participants or electronic meeting data itself.

The first computing device determines that the computing device has a first level role that includes privileges to control the first content contained in the first meeting window of the electronic meeting. The first computing device also determines that the computing device has a second level role for the second meeting window that includes privileges to view, but not control, the second content contained in the second meeting window of the electronic meeting.

The first computing device enables privileges to allow control of the first content in the first meeting window based upon the device capability with respect to the first meeting window and the determined first level role. The first computing device enables privileges to allow viewing, but not control, of the second content contained in the second meeting window on the computing device based upon the device capability with respect to the second meeting window and the determined second level role. The second computing device of the two or more computing devices has privileges to view, but not control, the first content contained in the first meeting window of the electronic meeting and has privileges to control the second content contained in the second meeting window of the electronic meeting.

2. Structural Overview

FIG. 1 is a block diagram that depicts an arrangement for managing multiple windows and multiple users within an electronic meeting. FIG. 1 includes participant client device 105, participant client device 115, collaboration manager 125, and an electronic meeting services system 130. The participant client device 105, the client device 115, the collaboration manager 125, and the electronic meeting services system 130 may be communicatively coupled via one or more networks including, for example one or more wired or wireless networks, such as local area networks (LANs), wide area networks (WANs), the Internet, as well as one or more direct connections. In addition, although the elements of FIG. 1 are depicted and described herein as being separate, this is done for explanation purposes only and the elements of FIG. 1 may be combined in any manner. For example, the electronic meeting services system 130 may be implemented on multiple separate servers that are communicatively coupled via one or more networks. Arrangements are not limited the particular elements depicted in FIG. 1 and may include fewer or additional elements depending upon a particular implementation.

Participant client device 105 and participant client device 115 may represent such electronic devices such as an Interactive Whiteboard (IWB) Appliance, a mobile device such as a smart phone or a tablet computer, a desktop computer, a laptop computer, wearable devices, and legacy electronic devices such as a telephone using a public switched telephone network (PSTN) or a plain old telephone service (POTS). Embodiments are not limited to any particular type of client device. In an embodiment, participant client device 105 and participant client device 115 may implement a collaboration client 110 and a collaboration client 120 respectively. In an embodiment, collaboration clients 110 and 120 represent application services implemented on participant client devices 105 and 115 configured to communicate electronic meeting requests to the collaboration manager 125. Electronic meeting requests may include, but are not limited to, electronic meeting initialization requests, electronic meeting termination requests, and meeting window role requests. In an embodiment, if a user of participant client device 105 wishes to initialize an electronic meeting, then the collaboration client 110 may generate an electronic meeting request, which may include user attendee information and a set of requested meeting services for the electronic meeting. The electronic meeting request is then sent to the collaboration manager 125 via the network. In an embodiment, collaboration clients 110 and 120 may receive data from the collaboration manager 125 that includes data for one or more windows to be displayed on participant client devices 105 and 115 respectively.

In an embodiment, an electronic meeting may include one or more windows of data that may represent different displays of data within the electronic meeting. For example, a first window may contain data displaying an annotation program from an IWB, a second window may contain data displaying an online chat window between participants, a third window may contain data displaying a document of the meeting agenda, and a fourth window may display data displaying a PowerPoint™ presentation. In an embodiment, data for the one or more windows that make up the electronic meeting is received by the collaboration manager 125 from the electronic meeting services system 130 and then is relayed to each of the participants using participant client devices 105 and 115, via collaboration clients 110 and 120.

Figure 6:
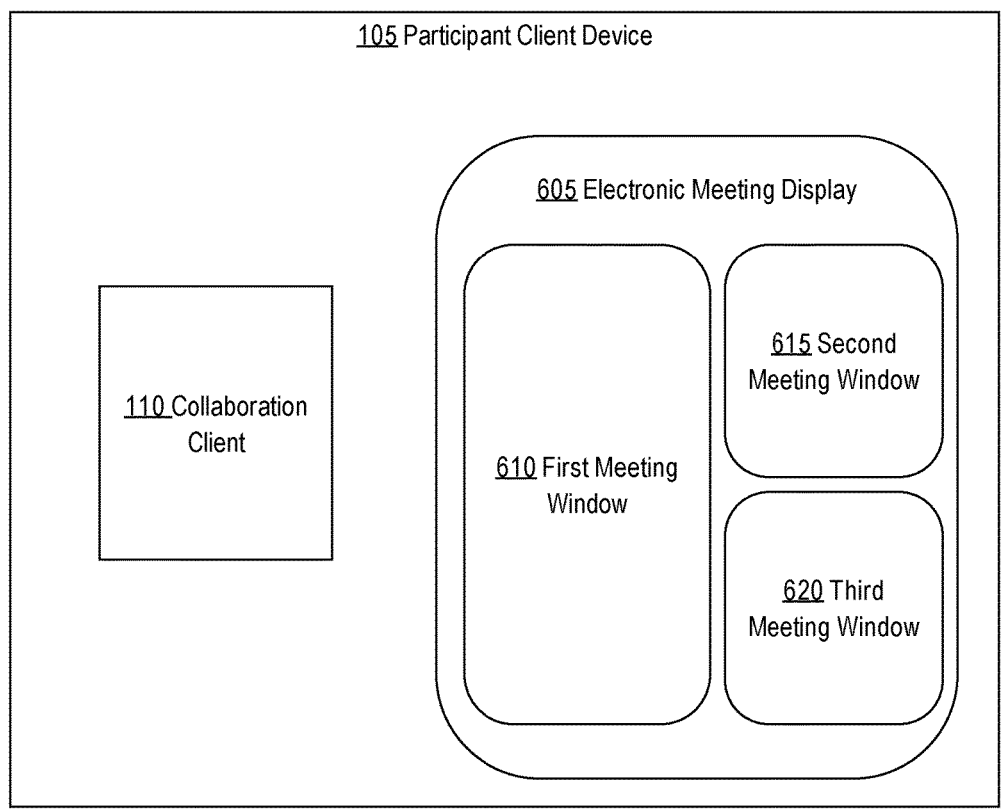
FIG. 6 depicts an example embodiment of a participant client device and the internal components used to execute display of an electronic meeting.

FIG. 6 depicts an example embodiment of participant client device 105 and the internal components used to execute the display of an electronic meeting. In an embodiment, the participant client device 105 includes the collaboration client 110 and the electronic meeting display 605. The electronic meeting display 605 may be configured to display multiple meeting windows including a first meeting window 610, a second meeting window 615, and a third meeting window 620.

Collaboration manager 125 may be implemented in computer hardware, computer software, or any combination of computer hardware and computer software. As one non-limiting example, collaboration manager 125 may be implemented as a process executing on one or more computing devices. In an embodiment, the collaboration manager 125 is configured to receive electronic meeting requests from participant client devices via collaboration clients 110 and 120 and process the electronic meeting requests accordingly. Processing the electronic meeting requests may include, but is not limited to, determining whether the requesting collaboration client has appropriate privileges to perform the request, communicating with the electronic meeting services system 130 to retrieve the data requested in the electronic meeting request, and sending the data from the electronic meeting services system 130 to the appropriate collaboration clients.

In an embodiment, the electronic meeting services system 130 is a community of one or more services that may be implemented to provide data for the electronic meeting. The community of one or more services may represent one or more applications implemented on one or more computing devices, for example servers, that provide different meeting functions and may interact with multiple application servers, data servers, and contact servers. In an embodiment, each service provides a specific meeting function within the one or more windows that make up the electronic meeting. In FIG. 1 the one or more services are depicted within the electronic meeting services system 130 and may represent one or more services running on one or more separate servers communicatively coupled within the network. FIG. 1 displays a sample set of services within the electronic meeting services system 130 including a device profile service 131, an application sharing service 132, a file sharing service 133, a voice over IP service 134, a messaging service 135, a meeting service 136, a chat service 137 and a lightweight directory access protocol (LDAP) database 138. Other embodiments of the electronic meeting services system 130 may include more or less services than displayed in FIG. 1.

In an embodiment, the device profile service 131 maintains client device information for client devices that may be participating in electronic meetings. The client device information may be maintained locally within electronic meeting services system 130, or may be maintained external to electronic meeting services system 130. Client device information may include, but is not limited to, a client device's IP address, MAC address, and functional capabilities of the client device. Functional capabilities may include capabilities for interacting with and receiving data during an electronic meeting. For example, the functional capabilities may define whether a particular client device is capable of receiving different types of audio data, video data, chat messages, and application specific functionality such as the ability to interact with an Annotation session displayed from an IWB device. In an embodiment, the collaboration manager 125 may query data in the device profile service 131 to determine which data may be requested and sent to different participant client devices. For example, if an electronic meeting includes an annotation session, then the collaboration manager 125 may query the device profile service 131 to determine which client devices participating in the meeting may receive annotation data. Participant client devices that are incapable of displaying annotation session data will not receive the annotation session data from the collaboration manager 125. By doing so, the collaboration manager 125 is able to reduce the amount of network bandwidth used between participant client devices and the collaboration manager 125 during the electronic meeting. This may be useful for participant client devices connected at locations where network bandwidth is limited.

In an embodiment, the application sharing service 132 is configured to enable sharing capabilities of an application running on one client device with other participants using other client devices. For example, if participant client device 105 intends to share the annotation application with participant client device 115, then the application sharing service 132 is capable of generating display data and controller data from the participant client device 105 and provides the data to participant client device 115. In an embodiment, the collaboration manager 125 may query the device profile service 131 to determine which the participants of the electronic meeting are eligible, based upon functional capabilities, to receive application specific sharing data from the participant client device 105. Once the eligible participants are determined, the collaboration manager 125 may route the data from the application sharing service 132 to each eligible participant client devices.

In an embodiment, the file sharing service 133 is configured to enable file sharing between participants of an electronic meeting. For example, if the participant client device 105 wants to share files within a specific directory with other participants of the electronic meeting, then the file sharing service 133 may enable file sharing with the other participants so that the other participants may be able to view the specific directory with the shared files. In an embodiment, requests to share files or stop sharing files from participant client devices are evaluated and routed to the file sharing service 133 by the collaboration manager 125.

In an embodiment, the voice over IP service 134 is configured to generate and maintain voice over IP sessions between electronic meeting participants. For example, when initiating a voice over IP session for a particular electronic meeting the collaboration manager 125 receives a voice over IP session request. The collaboration manager 125 would then look up participant client device profiles for each of the electronic meeting participants from the device profile service 121 and determine a voice over IP participant list to send to the voice over IP 134 service. The voice over IP 134 service would then receive the voice over IP session request and create and maintain the voice over IP session for the electronic meeting.

In an embodiment, the messaging service 135 is configured to generate and maintain a value-added service (VAS) between participants of an electronic meeting. VAS include non-core communication services such as, short messaging service (SMS), multimedia messaging service (MMS), and voice mail conversations in broadcast mode, multicast mode, and one-on-one mode. The messaging service 135 may be configured to interact with external gateways to push and pull plain text, multimedia, and voice messages. In an embodiment, the messaging service 135 may be configured to generate a custom VAS session in a window within the electronic meeting so that participants of the electronic meeting may communicate using the available VAS communication options. The collaboration manager 125 may send VAS requests from the participant client device 105 to the messaging service 135 in order to initiate and maintain a VAS session with participants capable of receiving VAS messages.

The meeting service 136 may represent an application that maintains electronic meeting connections between client devices and provides functionality for: starting the electronic meeting, allowing participant client devices to join the electronic meeting, and providing audio and video data for the electronic meeting including the data that populates the one or more meeting windows within the electronic meeting. In an embodiment, the meeting service 136 provides functionality that allows participant client devices of the electronic meeting that hold certain meeting roles. Meeting roles are specific privileges that are assigned to each participant client device that defines their level of access to data within the electronic meeting. For example, a first participant client device may have a "host" role that allows the first participant client device to view and modify data within the electronic meeting. Whereas a second participant client device may have a "guest" role which only allows the second participant client device viewing privileges for the data within the electronic meeting. In an embodiment, the meeting service 136 may query and store electronic meeting connection data and privilege data within other services such as the device profile service 131, the application sharing service 132, file sharing service 133, voice over IP service 134, messaging service 135, chat service 137, and LDAP database 138.

The chat service 137 may represent a chat relay application configured to initiate and maintain chat sessions between one or more participants of the electronic meeting. In an embodiment, for any given electronic meeting the chat service 137 may initiate and maintain a group chat between all electronic meeting participants, a group chat between a subset of electronic meeting participants, and a one-on-one chat between two electronic meeting participants. In an embodiment, the chat service 137 may be configured to record and archive chat sessions that take place during the electronic meeting. Additionally, the chat service 137 may be configured to synchronize a recording of a chat session with a recording of the electronic meeting itself.

The LDAP database 138 may represent a database configured to manage authentication credentials for available electronic meeting participants. In an embodiment, the LDAP database 138 may be queried by the collaboration manager 125 to determine potential participants that have sufficient credentials for various requests related to other meeting services. For example, the collaboration manager 125 may query the LDAP database 138 to determine the authenticated participants that are allowed to view specific files or applications within an electronic meeting. In another example, a request from the collaboration client 110 may include an authentication query to determine which participants are able to view the contents of a specific file. The authentication query is received by the collaboration manager 125 which then parses the query and communicates with the LDAP server 138 to determine the list of authenticated participants. The list of authenticated participants is then sent back to the collaboration client 110 and displayed as a list of available participants. Embodiments are described herein in the context of data for electronic meeting services system 130 being maintained in LDAP database 138, but this is done for explanation purposes only, and data for electronic meeting services system 130 may be maintained in any unstructured or structured format, and may be accessible using any type of protocol, or no protocol, depending upon a particular implementation.

3. Functional Overview

3.1. Collaboration Manager

Figure 2:
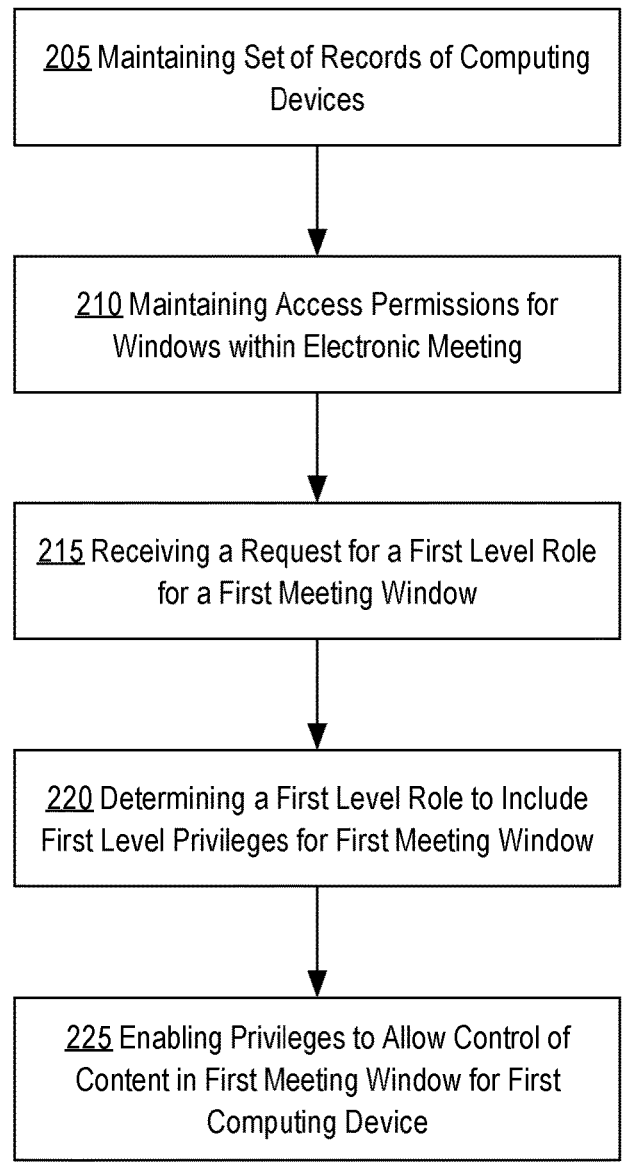
FIG. 2 is a flow diagram that depicts an example method for enabling privileges to allow control of a window, within an electronic meeting, for a computing device.

FIG. 2 is a flow diagram that depicts an example method for enabling privileges to allow control of a window, within an electronic meeting, for a computing device.

3.1.1. Initiating and Maintaining Electronic Meetings

At step 205, a set of records of computing devices that are capable of participating in an electronic meeting are maintained. In an embodiment, computing devices refer to available client devices, such as participant client device 105 and participant client device 115. FIG. 4 depicts example embodiments of data structures used to maintain records of available participant client devices. In an embodiment, client device table 405 represents a table of participant client devices capable of participating in electronic meetings and their associated meeting capabilities. Attributes of client device table 405 contain relevant attributes needed to communicate with the participant client device and their available capabilities. For example, row 1 of client device table 405 contains details for participant client device "Whiteboard_Campbell_01" describing the device type as being an electronic Whiteboard, its IP address as "1.2.3.4", its MAC address as "11.22.33.44.55.66", and its available electronic meeting capabilities to include: annotation capabilities, audio, video, and chat services. In an embodiment, client device table 405 may be maintained by the device profile service 131 within the electronic meeting services system 130. When the collaboration manager 125 is executing an electronic meeting initialization request, the collaboration manager 125 may communicate with the device profile service 131 to query the client device table 405 for information on how to connect to the participating client devices and which features, based meeting capabilities of the client devices, each participating client device is able to receive.

In other embodiments, maintaining the set of records of computing devices that are capable of participating in an electronic meeting may be stored within data objects other than a database table.

In an embodiment, when an electronic meeting has been established the participants of the electronic meeting may be maintained within another table such as a meeting table. Meeting table 410 in FIG. 4 represents a sample embodiment of a meeting table where different meeting IDs and the participants are maintained. Meeting table 410 includes a meeting ID used to identify specific electronic meetings, a host device ID that identifies a meeting host, and participant device IDs that identify the participant client devices. A meeting host may be defined as the participant client device that initiated the electronic meeting. The meeting host may be designated with specific privileges that allow the meeting host to transfer electronic meeting privileges to other participant client devices. Meeting privileges include, but are not limited to, data viewing and data control privileges within a specific window within the electronic meeting.

Referring back to FIG. 4, meeting table 410 may maintain participant records and hosts for multiple electronic meetings. For instance, rows 1-4 reference meeting ID 123456 and rows 5, 6 reference meeting ID 222390. Therefore meeting ID 123456 contains participant client devices "Whiteboard_Campbell_01, Whiteboard_NJ_01, Mobile_001, and PC_Rathna_01" and client device "Whiteboard_Campbell_01" is the host client. Whereas meeting ID 222390 contains participant client devices "PC_Sanjeev_01 and Mobile_222" with "PC_Sanjeev_01" as the host client device.

At step 210, access permissions for one or more meeting windows within an electronic meeting are maintained. In an embodiment, each of the meeting windows within the electronic meeting has particular access permissions that allow participant client devices to either view or control the data displayed. For instance, if client device Whiteboard_Campbell_01 has data control privileges for the annotation application window, then client device Whiteboard_Campbell_01 may be designated as having the role of the annotation host.

In an embodiment, a role table may be configured to maintain access permissions for meeting windows within electronic meetings managed by the collaboration manager 125. In FIG. 4 role table 415 represents an embodiment of a role table. When the collaboration manager 125 generates a new electronic meeting, one or more access permission roles may be generated and maintained within role table 415. For example, if participant client device Whiteboard_Campbell_01 creates an electronic meeting, designated as meeting ID 123456, then one or more permission roles are generated and the role table 415 maintains the one or more permission roles for the meeting 123456. In an embodiment, access permission roles are defined as specific roles assigned to specific meeting participants for each electronic meeting and each meeting window within each electronic meeting.

In an embodiment, different types of access permission roles may have different levels of access permissions for different meeting windows. Access permission roles, also referred to herein and in the figures simply as "roles," may include, but are not limited to, a meeting host, a file host, an application host, an annotation host, and a guest. For each electronic meeting, the participant client device that created the electronic meeting is initially designated with the meeting host role. The meeting host role gives the participant client device total control over all meeting functions. Total control includes, but is not limited to, having control over administrative functions within the electronic meeting, having control over application functionality for all meeting windows within the electronic meeting, having control over all file functions for files accessed during the electronic meeting, and having control over assigning roles to other meeting participant client devices. In an embodiment, control over application functionality and file functionality under the meeting host role may, may allow the meeting host to override application host and file host roles assigned to other participant client devices without revoking those specific roles. For example, if participant client device 105 is assigned the meeting host role and participant client device 115 is assigned the application host role, then when participant client device 105 attempts to change data within an application window that is currently controlled by participant client device 115, the meeting host role allows participant client device 105 to make the desired changes to the application window even though participant client device 115 holds the application host role. Thus, roles may define a hierarchy of access permissions.

In another embodiment, the meeting host role may be configured to automatically revoke application host and/or file host roles when the meeting host wishes takes control of an application or file within the electronic meeting. Using the prior example of the participant client device 105, assigned the meeting host role, and the client device 115, assigned the application host role, if the participant client device 105 attempts to change data within the application window, then the collaboration manager 125 revokes the application host role from the participant client device 115 and assigns it to the participant client device 105, so that the client device 105 may change data within the application window.

In an embodiment, a participant may be assigned the file host role. The file host role grants the participant access permissions for total control over file functions for files used during the meeting. For example referring to role table 415, the participant Whiteboard_NJ_01 is assigned the file host role. Whiteboard_NJ_01 then has authority to edit all files accessed during the electronic meeting.

In an embodiment, a participant client device may be assigned the application host role. The application host role grants the participant client device access permissions to control application functions for applications open during the electronic meeting. For example in role table 415, participant PC_Rathna_01 possesses the application host role. Therefore PC_Rathna_01 maintains control over the applications open in the electronic meeting. For instance, if a meeting window displays a slideshow on Microsoft PowerPoint, then PC_Rathna_01 is able to control the PowerPoint slides. In an embodiment, the application host role may allow the participant client device the ability to edit specific files that are open within the application window, such as having the ability to make changes to the PowerPoint presentation and then being able to save the changes made.

In an embodiment, the role table may define specific access roles for specific applications. For example, role table 415 defines an annotation host role that grants specific control over the annotation application within the electronic meeting. The annotation application is an electronic meeting application hosted on an IWB. In FIG. 4, table 415 participant Whiteboard_Campbell_01 has been granted the annotation host role and has control over annotation functions within the annotation application for meeting "123456." Therefore, during the electronic meeting a specific meeting window may display data of the annotation application for which Whiteboard_Campbell_01 has control over the data, while other participants may only view the data of the annotation application in the specific meeting window. In an embodiment, the role table may be configured to contain a specific access role for other applications such as Microsoft Word, Microsoft Excel, Microsoft PowerPoint, Microsoft Access, or any other specified application. By allowing the role table to include roles for specific application as well as a more general application role, the electronic meeting may maintain a level of access for applications that is based upon a configured level granularity desired by the user.

In an embodiment, participant client devices who only have view access to the meeting windows are assigned a guest role. The guest role designates a specific participant client device as having only read access to data displayed in the one or more meeting windows. For example, for meeting ID 123456, Mobile_001 is assigned the guest role and is only capable of viewing data within the meeting windows.

In an embodiment, different roles that grant participants control over data, such as annotation host role, file host role, and application host role, may be assigned to different participants as the electronic meeting progresses. For example, when a new electronic meeting is initiated by participant Whiteboard_Campbell_01, who is initially assigned the meeting host role, all other participants may be assigned, by default, the guest role only. This means that only Whiteboard_Campbell_01 has privileges to edit content within meeting windows based upon the top level meeting host role and the other participants only have read-only/view privileges. As the meeting progresses, Whiteboard_Campbell_01 may assign different roles to other participants such that other participants may be assigned edit privileges through a specific role for specific content. In another embodiment, initiation of the electronic meeting may be configured to, by default, automatically assign specific roles to select participants. By doing so, the meeting host would not have to manually assign specific roles to specific participants.

Referring back to FIG. 4, role table 415 displays different roles assigned to different participant client devices of meeting ID 123456. In an embodiment, a specific role may be assigned to only one participant at a time. However, a participant client device may hold several different roles simultaneously. For example, row 1 displays participant Whiteboard_Campbell_01 as having the meeting host role. Row 3 depicts client device Whiteboard_Campbell_01 as also having the annotation host role for the same electronic meeting, where the annotation host role grants data control privileges for data within the annotation application window within the electronic meeting. Although, the meeting host role contains privileges that may include the annotation host role privileges, an embodiment of the role table 415 may keep track of lower level roles, such as the annotation host role, by maintaining a record of which device currently holds each particular role. In this case, Whiteboard_Campbell_01 may control all general meeting functions and annotation functions under the meeting host role but, may also be assigned the annotation role for record keeping purposes. In other embodiments, if a participant client device holds both the meeting host role and the annotation host role, the role table may reflect the privileges of the particular client device, within the role table, as a single record defining the meeting host role. In this case, as the meeting host, the particular client device may assign the annotation host role to another participant client device which may then result in creation of a new record defining the annotation host role assignment in the role table.

The role table 415 in FIG. 4 depicts roles for a single electronic meeting "123456" for purposes of explanation only, and role table 415 may specify roles for any number of electronic meetings. Alternatively, separate role tables 415 may be maintained for each electronic meeting.

3.1.2. Receiving a Role Request from a Participant

Referring back to FIG. 2, at step 215 a request for a first level role for privileges to control data in a first meeting window is received. The collaboration manager 125 receives a role request from participant client device 105. The role request may be a request to control data within a specific meeting window of the electronic meeting. In an embodiment, a particular request for a role may include, but is not limited to, specifying the level of access permissions requested, the specific meeting within the electronic meeting, and the client device ID that is to receive the requested role.

Role requests may be defined by either their particular role type, such as, application host role, file host role, annotation host role, or by the level of control for a specific window. For example, if a role request specifies the specific type of role requested then the collaboration manager 125 may be able to determine whether the requesting participant client device will receive the specific role. Different roles may be referred to as either a first level role or a second level role, where the first level role is defined as a role that grants control privileges and the second level role is defined as a role that grants viewing privileges with respect to the meeting window specified in the request. For example, if participant client device 105 requested a first level role for a first meeting window where the first meeting window is the annotation window the collaboration manager 125 may determine that the participant client device 105 request is a request for the annotation host role for the annotation meeting window, which is the first meeting window. In another embodiment, a third or fourth level role may be defined to specify levels of access other than read/write or read only access.

In an embodiment, the role request from a participant client device may specify that the requesting participant client device is the participant client device that is making the request. For example, if participant client device 105 is requesting a first level role for the first meeting window, then the collaboration manager 125 determines that, if the request is granted, the participant client device 105 shall receive the annotation host role. In other embodiments, the participant client device may request a role for another participant client device. For example, participant client device 105 may request the file host role for participant client device 115. In yet other embodiments, role request from a participant client device may be a request to revoke or transfer a role from one participant client device to another participant client device. Details for acquiring roles, reassigning roles, and revoking roles from other participant client devices are discussed in the ROLE REQUESTS section herein.

At step 220, the collaboration manager 125 determines whether the requesting participant client device should receive the first level role for the requested first meeting window, where the first level role includes privileges to control the content within the first meeting window. In an embodiment, the collaboration manager 125 determines whether the requesting participant client device has privileges to receive the requested role for the requested meeting window. For example, if the participant client device 105 requested a first level role for the annotation window, then the collaboration manager 125 will determine, based on the associated privileges and the capabilities of the participant client device 105, whether the participant client device 105 should receive the annotation host role, thereby enabling the participant client device 105 to control the data within the annotation meeting window.

In an embodiment, the collaboration manager 125 may determine whether to grant the role request for the participant client device 105 based upon: the information within the role request, the capabilities of the participant client device 105, and whether other requested factors are associated with the requested role. As discussed in step 215, the role request received may contain the type of role being requested, the meeting window for which the role is being requested, and the participant client device that is seeking the role assignment. For example, the role request from participant client device 105 may include: a first level role request (a request to control data in the requested meeting window), a request associated with the annotation meeting window, and specifying participant client device 105. In this scenario, the collaboration manager 125 may determine that based on the request, the participant client device 105 is seeking the annotation host role for the annotation window.

In an embodiment, the collaboration manager may use the information from the role request and determine whether the participant client device seeking the requested role has sufficient capabilities to use the requested role. For example, if the participant client device 105 does not have capabilities that support the requested annotation host role, then the collaboration manager 125 may not grant the annotation host role to participant client device 105 since participant client device 105 is incapable of controlling data within the annotation window. If however the participant client device 105 does possess the requisite capabilities then the collaboration manager 125 may further determine whether to grant the requested role based upon approval of the request. For example, if participant client device 105 is Whiteboard_Campbell_01 from table 405, then the collaboration manager 125 would determine that participant client device 105 has the sufficient capabilities, based on the capability attributes from table 405, to control data within the annotation meeting window.

In an embodiment, if the requesting participant client device has the requisite capabilities to use the requested role, then the collaboration manager 125 may determine whether to grant the requested role based upon whether the requesting participant client device is approved for the requested role. For example, the requesting participant client device may be approved for the requested role if either: the requesting participant client device is already assigned the meeting host role, the assigned meeting host approves the role request, a different participant client device which possesses the requested role approves the role request for the requesting participant client device, or the role table is configured to allow the specific role request based upon either the requesting participant client device or the type of role requested.

In an embodiment, if the participant client device requesting the role is already assigned the meeting host role then based upon the administrative properties of the meeting host role, the client device may automatically be approved for the role requested. For example referring to FIG. 4 role table 415, if the participant client device 105 is Whiteboard_Campbell_01 which is already assigned the meeting role, then if participant client device 105 requests the file host role, then the collaboration manager 125 would automatically determine that participant client device 105 is approved for the file host role based upon being already assigned the meeting host role. In this manner, a participant client device requesting a particular role will be granted the particular role if the participant client has already been granted a higher role in a role hierarchy.

In an embodiment, if the participant client device has not already been assigned the meeting host role then the assigned meeting host may approve the role request. For example based upon role table 415, if the requesting participant client device is PC_Rathna_01 and the current meeting host is Whiteboard_Campbell_01, then the collaboration manager 125 may prompt the meeting host, in this case Whiteboard_Campbell_01, to approve the role request from PC_Rathna_01. In another embodiment, the meeting host may preconfigure approvals for select participant client device during the electronic meeting or during the setup of the electronic meeting. For example, meeting host Whiteboard_Campbell_01 may preconfigure the collaboration manager 125 to automatically allow all participant client devices to be approved for application control during the current electronic meeting.

In an embodiment, the participant client device, which currently holds the requested role, may be allowed to approve the role request from the requesting participant client device. For example referring to role table 415, if the requested role is application host, then based upon the role table 415 the current application host, PC_Rathna_01, may have the capability to approve a role request for the application host role. In this example, if mobile_001 requested the application host role, then the collaboration manager 125 may be configured to prompt the current application role holder, PC_Rathna_01, for approval to revoke the application host role from PC_Rantha_01 and assign it to the requesting participant client device, Mobile_001.

In another embodiment, the role table may be configured to store role request logic that may be used to approve incoming role requests based upon the requesting participant client device and/or based upon the type of role requested. For example, the role table may be configured to store logic that allows participant client devices requesting the application host role to be approved. By configuring logic to allow electronic meeting participants to get application control upon request, participants may be able to freely exchange application control of a meeting window for the purposes of collaboration. In another example, the role table may be configured to allow select participant client devices to be authorized to receive data control of a meeting window upon request. By allowing select participant client devices automatic role approval, collaboration may be more efficient between known participants during the electronic meeting.

3.1.3. Enabling Roles for Participants

In an embodiment, after the collaboration manager 125 determines that the requesting participant client device should receive the requested role, the collaboration manager 125 updates the role table to reflect the requested role for the requesting participant client device. Upon updating the role table, the collaboration manager 125 then enables privileges for the specific meeting window for the requesting participant client device. Referring back to FIG. 2 at step 225, privileges are enabled for the requesting participant client device to receive access permissions for the requested meeting window according to the granted role. In an embodiment, the collaboration manager 125 enables privileges for the requesting participant client device by sending the privilege request to the specific meeting service associated with the requested meeting window. For example, if the granted role request was a request for the annotation role for the annotation window for participant client device 105, then the collaboration manager 125 would then send the privilege request that grants access control to participant client device 105 to the application sharing service 132 which controls application sharing during the electronic meeting.

In an embodiment, the application sharing service 132 would then generate annotation window control data, which allows participant client device 105 to control the annotation application within the annotation window. The annotation window control data would then be sent to the collaboration manager 125 for routing to the participant client device 105. The collaboration manager 125 then receives the annotation window control data and sends the annotation window control data to the participant client device 105 along with the view content for the annotation window.

3.2. Collaboration Client

Figure 3:
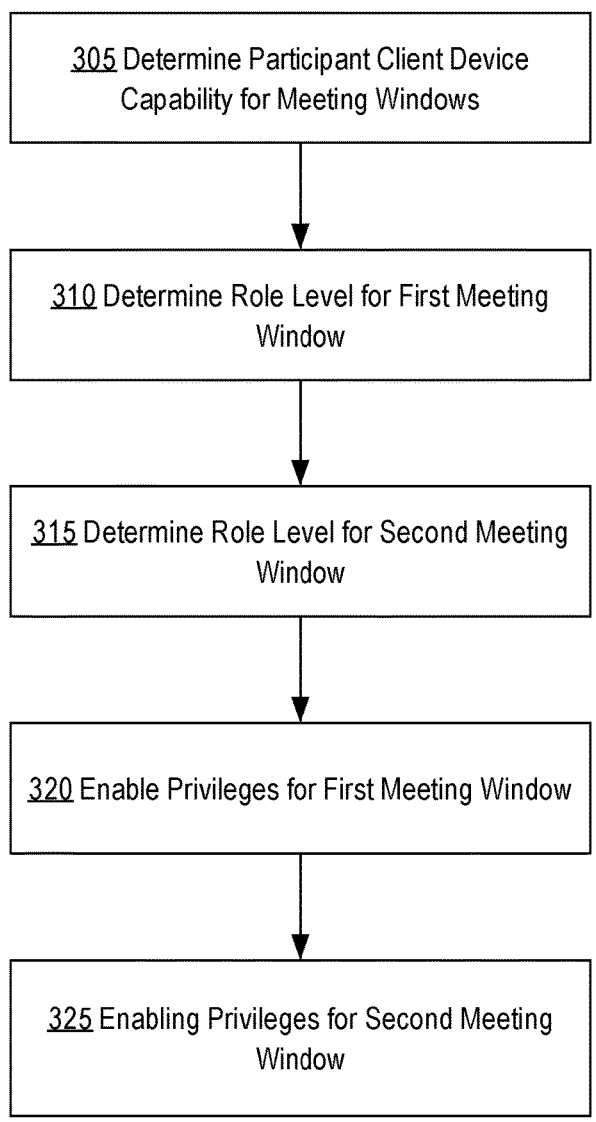
FIG. 3 is a flow diagram that depicts an example method for determining capabilities and roles for multiple meeting windows displayed on a computing device and enabling privileges for each of the multiple windows based upon the capabilities and roles of the computing device.

FIG. 3 is a flow diagram that depicts an example method for determining capabilities and roles for multiple meeting windows displayed on a computing device and enabling privileges for each of the multiple windows based upon the capabilities and roles of the computing device.

3.2.1. Determining Client Device Capabilities

At step 305, device capability for a participant client device is determined for each meeting window within the electronic meeting. In an embodiment, when the participant client device 105 is participating in an electronic meeting, the collaboration client 110, within the participant client device 105 determines the device capabilities of the participant client device 105, with respect to each meeting window. As discussed previously, the electronic meeting may include one or more meeting windows that display content. The one or more meeting windows are displayed within the electronic meeting display 605, as depicted in FIG. 6. Depending upon the type of content and the type of interaction allowed for the participant client device 105, each meeting window within the electronic meeting display 605 may have different capabilities enabled with respect to the participant client device 105. For example, if the participant client device 105 is a mobile device that does not support interactions with the annotation application and if the first meeting window 610 displays annotation content, then the collaboration client 110 would determine that the participant client device 105 is unable to request annotation control of the first meeting window 610. If however, the second meeting window 615 displays application content that the participant client device 105 is able to control, then the collaboration client 110 would determine that the participant client device 105 is able to request control functionality for the second meeting window 615.

In another embodiment, participant client device capabilities may be determined by sending a query request to the collaboration manager 125, which then may query the client device capabilities stored within the device profile service 131. For example, collaboration client 110 may send a query request to the collaboration manager 125 to determine the capabilities of the participant client device 105. The collaboration manager 125 may then generate a query, from information in the received query request, to perform on the client device table within the device profile service 131. Upon receiving the results of the query, the collaboration manager 125 may then forward the query results of the participant client device 105 back to the collaboration client 110.

In an embodiment, determining participant client device capabilities are not limited to a single participant client device within the electronic meeting. For example, if the electronic meeting contains participant client device 105 and participant client device 115, then collaboration client 110 and collaboration client 120 may both determine the device capabilities for each meeting window on participant client device 105 and participant client device 115 respectively.

3.2.2. Determining Client Device Roles

In an embodiment, each meeting window within the electronic meeting may be controlled by a participant client device. Control privileges for a given window may be assigned to a participant client device by assigning a particular meeting window role to the participant client device. Roles for each meeting window are managed by the collaboration manager 125. Each of the participant client devices, of the electronic meeting, may then query the collaboration manager 125 for a role status to determine their control privileges for each of the meeting windows.

At step 310, a participant client device role for a first meeting window is determined. In an embodiment, collaboration client 110 determines the currently assigned role for the participant client device 105 for the first meeting window 610 by sending a role status request to the collaboration manager 125. The collaboration manager 125 receives the role status request and determines, from the role status request, the participant client device 105 and the particular meeting window, the first meeting window 610, for which the role status is desired. The collaboration manager 125 may then query the role table to determine the current role assigned to the participant client device 105. Upon determining role status results for the participant client device 105 for the first meeting window 610, the collaboration manager 125 sends the role status results back to the collaboration client 110.

At step 315, a participant client device role for a second meeting window is determined. In an embodiment, collaboration client 110 determines the currently assigned role for the participant client device 105 for the second meeting window 615 by sending a role status request to the collaboration manager 125. The collaboration manager 125 receives the role status request and determines the participant client device 105 and the second meeting window 615, for which the role status is desired. The collaboration manager 125 then queries the role table to determine the current role assigned to the participant client device 105. Upon determining role status results for the participant client device 105 for the second meeting window 615, the collaboration manager 125 sends the role status results back to the collaboration client 110.

In an embodiment, the collaboration client 110 may also determine the role status for the participant client device 105 for the third meeting window 620 by sending a role status request to the collaboration manager 125. The collaboration manager 125 may then query the role table to determine the current role assigned to the participant client device 105. Upon determining role status results for the participant client device 105 for the third meeting window 620, the collaboration manager 125 sends the role status results back to the collaboration client 110. In yet other embodiments, the collaboration client 110 may determine the role status for any other meeting window by sending a role status request to the collaboration manager 125. In yet another embodiment, the collaboration client 110 may determine whether the participant client device 105 has administrative roles associated with the meeting host role by sending a role status request to the collaboration manager that specifies querying whether the participant client device 105 is the meeting host. By doing so, the collaboration client 110 may determine whether special administrative functions for the electronic meeting should be enabled.

In yet another embodiment, the collaboration client 110 may determine the role statuses for all windows within the electronic meeting by sending a role status request to the collaboration manger 125. The collaboration manger 125 may query the role table and then determine each of the roles assigned to the participant client device 105 for each window within the electronic meeting.

3.2.3. Enabling Privileges for Meeting Windows

At step 320, participant client device privileges are enabled based upon the capabilities and assigned role determined for the participant client device. In an embodiment, the collaboration client 110 may enable privileges for the first meeting window 610 for the participant client device 105 based upon the determined device capabilities from step 305 and the determined role assigned to the participant client device 105 from step 310. For example, if at step 305 it is determined that the participant client device 105 is capable of running and controlling an annotation application and at step 310 it is determined that the participant client device 105 has been assigned the annotation host role for the first meeting window 610, then the collaboration client 110 may enable functionality within the electronic meeting that allows the participant client device 105 to control annotation application content within the first meeting window 610.

In an embodiment, ability to control content within a meeting window may be assigned to only one user at one time. For example, if participant client device 105 is assigned the annotation host role for the first meeting window 610, then while participant client device 105 is the annotation host, participant client device 115 may not be assigned the same annotation host role. Therefore the collaboration client 120 on participant client device 115 may only enable viewing privileges, as the guest role, for the first meeting window on the participant client device 115 while participant client device 105 holds the annotation host role.

In another embodiment, certain meeting windows may be configured to allow special functionality that allows multiple participant client devices the ability to control content within a specific meeting window. If a specific application allowed functionality where two or more users controlled content at the same time, then two or more unique roles may exist within the role table that allow two or more participant client devices to control content within the same meeting window. For instance, the role table may have roles "application host1" and "application host 2" which both allow content to be controlled by two different users. By giving each user a unique host role within the same meeting window, the collaboration manager is able to manage each user's input and is able to reassign or revoke privileges on a user by user basis.

At step 325, participant client device privileges are enabled based upon the capabilities and assigned role determined for the participant client device. In an embodiment, the collaboration client 110 may enable privileges for the second meeting window 615 for the participant client device 105 based upon the determined device capabilities from step 310 and the determined role assigned to the participant client device 105 from step 315. For example, if at step 310 it is determined that the participant client device 105 is capable of receiving content that displays a PowerPoint application and at step 310 it is determined that the participant client device 105 has been assigned the guest role for the second meeting window 610, then the collaboration client 110 may enable functionality within the electronic meeting that allows the participant client device 105 view, but not control, the PowerPoint content within the second meeting window 615. Since participant client device 105 was determined to be a guest for the second meeting window, the collaboration client 120 may determine that the participant client device 115 has been assigned the application host role for the second meeting window 615. Therefore the participant client device 115 may be able to control content within the second meeting window 615, while the participant client device 105 is only able to view, but not control, the content within the second meeting window 615.

In an embodiment, the collaboration client 110 may enable privileges based upon participant client device capability and the assigned roles for other specific windows within the electronic meeting. For example, the collaboration client 110 may enable file sharing privileges for the third meeting window 620 if the participant client device 105 has been assigned the file host role for the third meeting window 620.

In an embodiment, electronic meeting functionality that is related to administrative functions may be enabled based upon the participant client device capabilities and the electronic meeting role assigned to the participant client device. In an embodiment, the collaboration client 110 may determine that the participant client device 105 is assigned the meeting host role for the electronic meeting. The meeting host role enables specific administrative functionalities for the participant client device including, but not limited to, starting and ending the electronic meeting, controlling content sent to other participant client devices, sharing meeting windows, and controlling the assignment of other host roles to other participant client devices.

In an embodiment, the collaboration client 110 may enable electronic meeting specific functions as described in the following table:

| Function | Description |
| --- | --- |
| Start Meeting | Starts meeting session on host device |
| Invite Participants | Invite additional participants during meeting |
| Mute Meeting <All> | Mutes the meeting for all participants |
| Mute Meeting <Audio> | Mutes audio on host side |
| Mute Meeting <Video> | Mutes video on host side |
| Start Record Meeting | Start meeting recording |
| Pause/Resume Record Meeting | Pause/Resume meeting recording |
| End Record Meeting | Stop meeting recording |

In an embodiment, the participant client device 105, as the meeting host, may be able to initiate the electronic meeting and invite additional participants to the electronic meeting while the meeting is in progress. The participant client device 105 is also able to control content displayed in audio and video format by using the mute functionality either locally or globally. As the meeting host, the participant client device 105 is able to mute content sent to all participating client devices. In an embodiment, if the participant client device 105 mutes all participants then the collaboration client 110 would send a mute all request to the collaboration manger 125, which would authenticate the request and then send the mute command to each of the other participant client devices.

In an embodiment, the participant client device 105 has the functionality, as the meeting host, to generate a recording of the electronic meeting which includes all content displayed within the meeting windows. All content may include a recording of all audio and video transmitted to participants and all administrative actions performed within the electronic meeting. Additionally, record functionality may also include recording select meeting windows within the electronic meeting.

In an embodiment, the meeting host may also manage role assignments for other participant client devices. The following table highlights the meeting host role management functionality enabled on the meeting host participant client device.

| Function | Description |
| --- | --- |
| Give Control Meeting <User> | Gives meeting host role to specified user |
| Give Control File <User> | Gives file host role to specified user |
| Give Control Application <User> | Gives application host role to specified user |
| Give Control Annotation <User> | Gives annotation host role to specified user |
| Revoke Control <Type> <User> | Revokes specified role for specified user |

In an embodiment, the meeting host may transfer the meeting host role to another participant client device specified. For example, participant client device 105 may transfer the meeting host role to participant client device 115. In this scenario, the collaboration client 110 would send a role reassignment request to the collaboration manager 125, which would then update the role table with the new assignment. Similarly, the meeting host may reassign other host roles such as the file host role, the application role, and the annotation application role, or any other role defined within the role table. Additionally, the role reassignment requests may also include the specific meeting window when applicable. In an embodiment, the meeting host may also revoke an assigned role by specifying within a role revocation request the type of role revoked and the specific participant client device.

Enabling electronic meeting functionalities are not limited to only the meeting host. In an embodiment, participant client devices, other than the meeting host, may have specific electronic meeting functions that are not meeting window specific. For example, each participant client device may be enabled to initiate chat sessions with other participants, send and receive electronic messages between participants, send and receive voice messages between participants, and any other communication functionality that is determined to be capable on the participant client device. The following table list examples of specific electronic meeting functionality that may be enabled on a participant client device by the collaboration manager if the capability exists on the participant client device.

| Function | Description |
| --- | --- |
| Start Chat | Start chat conversation |
| Send Chat <Message> | Send chat message to all users |
| Send Chat <Message> <Users> | Send chat message to specified users |
| Send SMS <Users> | Send text message to specified users |
| Send MMS <Users> | Send multimedia text to specified users |
| Send Voice Mail <Users> | Send voice message to specified users |

In an embodiment, each of the functions listed above may specify all participant client devices within the electronic meeting or only specify a subset of participant client devices. By doing so, each participant client device may broadcast communication to all participants or send communication to a specific set of participants.

The collaboration client may also be configured to determine capabilities and roles of other participant client devices for the purposes of determining and displaying participant client devices that may be available to receive role assignments or other communication. In an embodiment, the collaboration client 110 may be configured to send a participant query request to the collaboration manager 125 to determine which participants may have the capabilities required by a specific role assignment. For example, if the participant client device 105 intends to assign the annotation host role to another participant, the collaboration client 110 may send a participant query request to the collaboration manager 125 to determine which participants have the capability to use the annotation host role. This functionality eliminates the problem of assigning a role to a participant that is not equipped with the proper capabilities to use the assigned role and therefore increases the efficiency of role assignments by only allowing specific roles to be assigned to participants that are able to use those roles. In an embodiment, the collaboration manager 125 may send back a participant list, to the collaboration client 110, of available participant client devices able to receive the role assignment. The participant list may then be displayed on the participant client device 105.

In an embodiment, querying capabilities of other participant client devices is not limited to the meeting host. Other participants may be able to query capabilities of other participant client devices for the purpose of communicating with other participant client devices. For example, the collaboration client 120, on the participant client device 115, may request from the collaboration manager 125 a list of participant client devices that are capable of receiving an MMS. By doing so, the participant client device 115 may determine whether all of the intended participants of the MMS are able to receive the MMS. If there are some intended participants that are not capable of receiving the MMS communication, then the participant client device 115 may choose to use a different form of communication, such as chat or SMS, to communicate to the intended participants.

4. Role Requests

Roles maintained in a role table may be used to allow multiple different participant client devices, within an electronic meeting, to concurrently control different aspects of the electronic meeting. In an embodiment, different aspects of the electronic meeting may be defined as content data within multiple different meeting windows displayed within the electronic meeting. During the course of the electronic meeting different roles may be used to keep track of which participant client devices control content data within different meeting windows. For example, participant client device 105 may control content within a first meeting window while participant client device 115 may control content within a second meeting window concurrently. During the course of the electronic meeting other participant client devices may request for and be granted control of meeting windows within the electronic meeting. These role requests may include multiple transfers of roles from participant client devices to other participant client devices.

Figure 5:
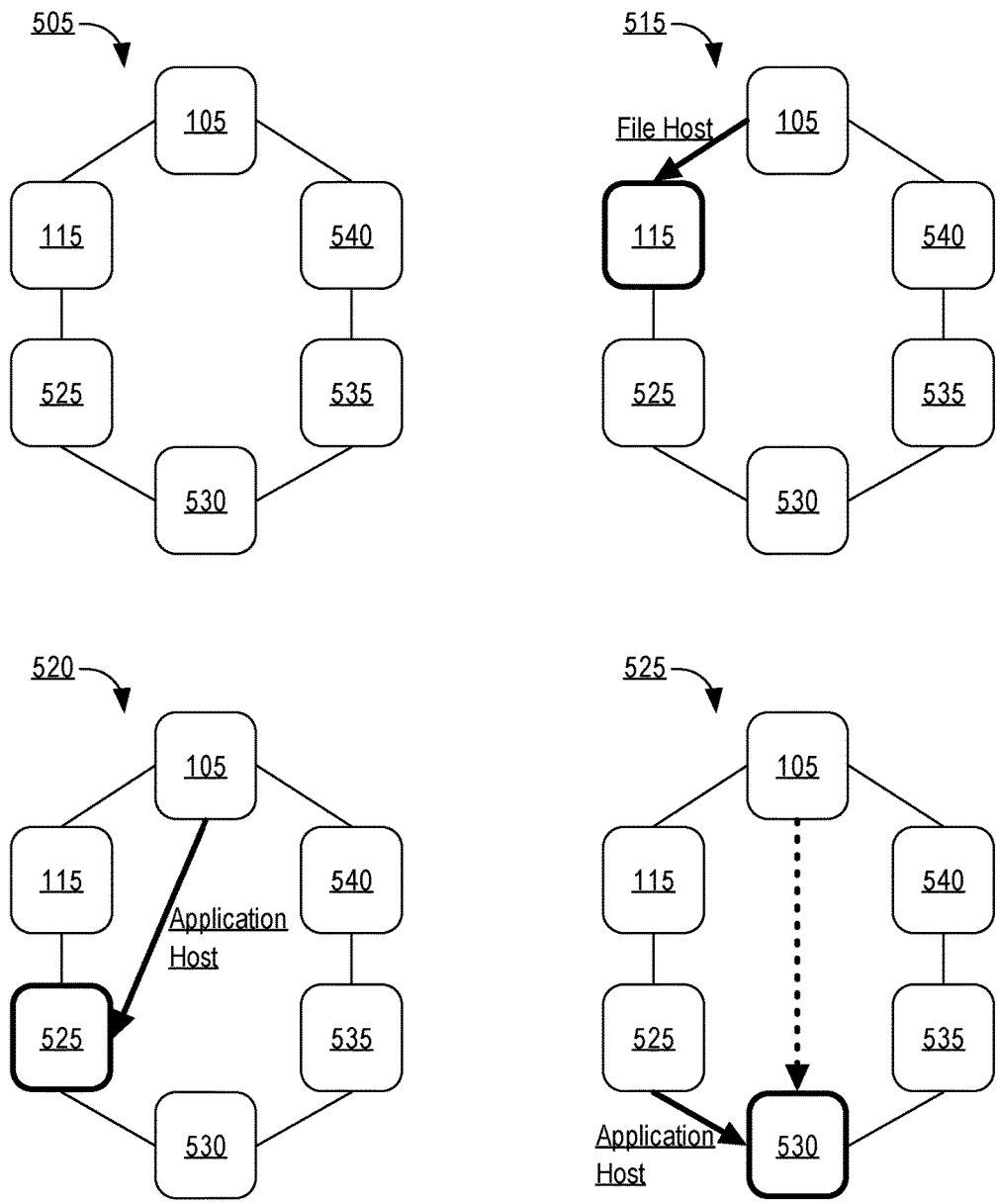
FIG. 5 depicts example embodiments of multiple client devices participating in an electronic meeting where different roles are assigned to different participant client devices.

FIG. 5 depicts example embodiments of multiple client devices participating in an electronic meeting where different roles are assigned to different participant client devices. View 505 depicts an electronic meeting with participants that include: participant client device 105, participant client device 115, participant client device 525, participant client device 530, participant client device 535, and participant client device 540. In view 505, the participant client device 105 initiated the meeting and is automatically assigned the meeting host role. In an embodiment, as the initiator and meeting host the participant client device 105 may be automatically assigned all host roles, including file host, application host, and annotation host, while the other participants are assigned guest role within the role table. In view 505, participant client device 105 maintains control of all meeting windows within the electronic meeting while the other participant client devices may only view content within the electronic meeting.

View 515 depicts an example of assigning the file host role to participant client device 115. In an embodiment, the file host role may be assigned to participant client device 115 be either a direct request from participant client device 115 for the file host role, or by reassignment of the file host role by participant client device 105 as the meeting host.

In an embodiment, if the participant client device 115 requests the file host role, then the collaboration manager 125 would receive a role request from the participant client device 115 which includes request details containing a request for the file host role and a particular meeting window associated with the file host role. For example, if a meeting window displayed content that included a PowerPoint presentation of file B.ppt, then the role request from participant client device 115 may include a file host role request for the meeting window displaying the B.ppt file. The collaboration manager 125 may then prompt the participant client device 105, as the meeting host, for approval of the role request. Upon approval, the collaboration manager 125 may reassign the file host role to the participant client device 115 and send a request to the application sharing service 132 to reflect the file host role reassignment.

In another embodiment, the participant client device 105 may initiate a role reassignment request to reassign the file host role for the meeting window displaying the B.ppt file to participant client device 115. The collaboration manager 125 would then receive a role reassignment request from the participant client device 105. Since the participant client device 105 is the meeting host, approval would be implied and the collaboration manger 125 would automatically reassign the file host role to participant client device 115.

After assignment of the file host role to participant client device 115, as shown in view 510, the role table would reflect the following role assignments: participant client device 105 as the meeting host, participant client device 115 as the file host for the meeting window displaying file B.ppt, and participant client device 525, participant client device 530, participant client device 535, and participant client device 540 as guests.

View 515 depicts an example of assigning the application host role to participant client device 525. In an embodiment, the application host role for a particular meeting window may be assigned to participant client device 525. For example, meeting host participant client device 105 may open a new meeting window that contains content displaying a Notepad application. After opening the new meeting window, the participant client device 105 may assign the application host role for the new meeting window to the participant client device 525. As described above, if the participant client device 105 assigns the application host role for the new meeting window to participant client device 525, the collaboration manager 125 would receive a role reassignment request from the participant client device 105 and reassign the application host role to participant client device 525. In another embodiment, the participant client device 525 may request for the application host role, which would cause the collaboration manager 125 to receive a role request from the participant client device 525 and prompt the meeting host, participant client device 105, for approval for the reassignment.

After assignment of the application host role to participant client device 525, as shown in view 515, the role table would reflect the following role assignments: participant client device 105 as the meeting host, participant client device 115 as the file host for the meeting window displaying file B.ppt, participant client device 525 as the application host for the meeting window displaying the notepad application, and participant client device 530, participant client device 535, and participant client device 540 as guests.

View 525 depicts an example of assigning the application host role for the meeting window displaying the notepad application to participant client device 530. Assignment of the application host role for the notepad application window may occur by either: the meeting host revoking and reassigning the application host role unprompted, the participant client device 530 requesting the meeting host to reassign control of the notepad application window, or the participant client device 530 requesting the current application host to allow reassignment of the application role.

In an embodiment, the participant client device 105, as the meeting host, has the ability to reassign roles from one participant client device to another participant client device. For example, the participant client device 105 may revoke the application host role from the participant client device 115 and reassign the application host role to the participant client device 530. In another embodiment, the participant client device 530 may generate a role request for the application host role to the collaboration manager 125. The collaboration manager 125 may then prompt the meeting host (participant client device 105) for approval to reassign the role. In yet another embodiment, the participant client device 530 may generate a role request that specifies asking permission for the application role from the current application role holder. For example, the participant client device 530 may generate and route a request, via the collaboration manager 125, to the current application host (participant client device 525) to ask permission for the application host role. In this scenario, the participant client device 525 may be able to approve the reassignment of the application host role from the participant client device 525 to the participant client device 530.

As a result, after assignment of the application host role from the participant client device 525 to the participant client device 530, the role table would reflect the following role assignments: participant client device 105 as the meeting host, participant client device 115 as the file host for the meeting window displaying file B.ppt, participant client device 530 as the application host for the meeting window displaying the notepad application, and participant client device 525, participant client device 535, and participant client device 540 as guests.

5. Implementation Examples

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

FIG. 7 is a block diagram that depicts an example computer system 700 upon which embodiments may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. Although bus 702 is illustrated as a single bus, bus 702 may comprise one or more buses. For example, bus 702 may include without limitation a control bus by which processor 704 controls other devices within computer system 700, an address bus by which processor 704 specifies memory locations of instructions for execution, or any other type of bus for transferring data or signals between components of computer system 700.

An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic or computer software which, in combination with the computer system, causes or programs computer system 700 to be a special-purpose machine. According to one embodiment, those techniques are performed by computer system 700 in response to processor 704 processing instructions stored in main memory 706. Such instructions may be read into main memory 706 from another non-transitory computer-readable medium, such as storage device 710. Processing of the instructions contained in main memory 706 by processor 704 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 700, various computer-readable media are involved, for example, in providing instructions to processor 704 for execution. Such media may take many forms, including but not limited to, non-volatile and volatile non-transitory media. Non-volatile non-transitory media includes, for example, optical or magnetic disks, such as storage device 710. Volatile non-transitory media includes dynamic memory, such as main memory 706. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 704. For example, the instructions may initially be stored on a storage medium of a remote computer and transmitted to computer system 700 via one or more communications links. Bus 702 carries the data to main memory 706, from which processor 704 retrieves and processes the instructions. The instructions received by main memory 706 may optionally be stored on storage device 710 either before or after processing by processor 704.

Computer system 700 also includes a communication interface 718 coupled to bus 702. Communication interface 718 provides a communications coupling to a network link 720 that is connected to a local network 722. For example, communication interface 718 may be a modem to provide a data communication connection to a telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be processed by processor 704 as it is received, and/or stored in storage device 710, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
one or more processors; and
one or more memories storing instructions which, when processed by one or more processors, cause:
a collaboration client service, determining device capability of a computing device with respect to a first meeting window containing first content and a second meeting window containing second content within an electronic meeting;
wherein the electronic meeting is a collaborative meeting between two or more computing devices each concurrently displaying two or more meeting windows that include the first meeting window containing the first content and the second meeting window containing the second content;
the collaboration client service, determining that the computing device has been assigned, for the first meeting window, a first level role that includes privileges to control the first content contained in the first meeting window of the electronic meeting;
the collaboration client service, determining that the computing device has been assigned, for the second meeting window, a second level role that includes privileges to view, but not control, the second content contained in the second meeting window of the electronic meeting;
the collaboration client service determining, based upon the determined device capability of the computing device with respect to the first meeting window, whether the computing device has the capability to perform one or more functions in the first meeting window required by the first level role;
the collaboration client service, in response to determining that the computing device has the capability to perform the one or more functions in the first meeting window required by the first level role and that the computing device has been assigned the first level role for the first meeting window, enabling privileges to allow the computing device to control the first content contained in the first meeting window of the electronic meeting;
the collaboration client service determining, based upon the determined device capability of the computing device with respect to the second meeting window, whether the computing device has the capability to perform one or more functions in the second meeting window required by the second level role;
the collaboration client service, in response to determining that the computing device has the capability to perform the one or more functions in the second meeting window required by the second level role and that the computing device has been assigned the second level role for the second meeting window, enabling privileges to allow the computing device to view, but not control, the second content contained in the second meeting window of the electronic meeting;
wherein a second computing device that is different from the computing device that is participating in the electronic meeting has privileges to view, but disallow control, of the first content contained in the first meeting window of the electronic meeting and has privileges to allow control of the second content contained in the second meeting window of the electronic meeting.

2. The apparatus of claim 1, wherein the instructions include additional instructions which, when processed by the one or more processors, cause:
determining that the computing device has, for a third meeting window, a first level role that includes privileges to control a third content contained in the third meeting window of the electronic meeting;
enabling privileges, based upon the device capability with respect to the third meeting window and the determined first level role, to allow control of the third content contained in the third meeting window of the electronic meeting.

3. The apparatus of claim 1, wherein the instructions include additional instructions which, when processed by the one or more processors, cause:
determining that the computing device has, an administrative role that includes privileges to control administrative functions for the two or more meeting windows of the electronic meeting and administrative functions for the electronic meeting;
enabling privileges, based upon the device capability with respect to administrative functions, to allow control administrative functions for the two or more meeting windows of the electronic meeting and administrative functions for the electronic meeting.

4. The apparatus of claim 3, wherein the administrative functions include functionality to assign or revoke privileges, of the two or more computing devices, to the two or more meeting windows of the electronic meeting.

5. The apparatus of claim 3, wherein the instructions include additional instructions which, when processed by the one or more processors, cause:
determining device capability of a third computing device with respect to a first meeting window containing first content within an electronic meeting;
determining that the third computing device has, for the first meeting window, a second level role that includes privileges to view, but not control, the first content contained in the first meeting window of the electronic meeting.

6. The apparatus of claim 5, wherein the instructions include additional instructions which, when processed by the one or more processors, cause:
disabling privileges of the second computing device with respect to privileges to allow control of the second content contained in the second meeting window based upon control administrative privileges held by the computing device.

7. The apparatus of claim 6, wherein the instructions include additional instructions which, when processed by the one or more processors, cause:
enabling privileges of the third computing device with respect to privileges to allow control of the second content contained in the second meeting window based upon control administrative privileges held by the computing device.

8. One or more non-transitory computer readable media storing instructions, which when processed by one or more processors, cause:
determining device capability of a computing device with respect to a first meeting window containing first content and a second meeting window containing second content within an electronic meeting;
wherein the electronic meeting is a collaborative meeting between two or more computing devices each concurrently displaying two or more meeting windows that include the first meeting window containing the first content and the second meeting window containing the second content;

determining that the computing device has been assigned, for the first meeting window, a first level role that includes privileges to control the first content contained in the first meeting window of the electronic meeting;

determining that the computing device has been assigned, for the second meeting window, a second level role that includes privileges to view, but not control, the second content contained in the second meeting window of the electronic meeting;

determining, based upon the determined device capability of the computing device with respect to the first meeting window, whether the computing device has the capability to perform one or more functions in the first meeting window required by the first level role;

in response to determining that the computing device has the capability to perform the one or more functions in the first meeting window required by the first level role and that the computing device has been assigned the first level role for the first meeting window, enabling privileges to allow the computing device to control the first content contained in the first meeting window of the electronic meeting;

determining, based upon the determined device capability of the computing device with respect to the second meeting window, whether the computing device has the capability to perform one or more functions in the second meeting window required by the second level role;

in response to determining that the computing device has the capability to perform the one or more functions in the second meeting window required by the second level role and that the computing device has been assigned the second level role for the second meeting window, enabling privileges to allow the computing device to view, but not control, the second content contained in the second meeting window of the electronic meeting;

wherein a second computing device that is different from the computing device that is participating in the electronic meeting has privileges to view, but disallow control, of the first content contained in the first meeting window of the electronic meeting and has privileges to allow control of the second content contained in the second meeting window of the electronic meeting.

9. The one or more non-transitory computer readable media of claim 8, further comprising additional instructions which, when processed by the one or more processors, cause:

determining that the computing device has, for a third meeting window, a first level role that includes privileges to control the third content contained in the third meeting window of the electronic meeting;

enabling privileges, based upon the device capability with respect to the third meeting window and the determined first level role, to allow control of the third content contained in the third meeting window of the electronic meeting.

10. The one or more non-transitory computer readable media of claim 8, further comprising additional instructions which, when processed by the one or more processors, cause:

determining that the computing device has, an administrative role that includes privileges to control administrative functions for the two or more meeting windows of the electronic meeting and administrative functions for the electronic meeting;

enabling privileges, based upon the device capability with respect to administrative functions, to allow control administrative functions for the two or more meeting windows of the electronic meeting and administrative functions for the electronic meeting.

11. The one or more non-transitory computer readable media of claim 10, wherein administrative functions include functionality to assign and revoke privileges, for the two or more computing devices, to the two or more meeting windows of the electronic meeting.

12. The one or more non-transitory computer readable media of claim 10, further comprising additional instructions which, when processed by the one or more processors, cause:

determining device capability of a third computing device with respect to a first meeting window containing first content within an electronic meeting;

determining that the third computing device has, for the first meeting window, a second level role that includes privileges to view, but not control, the first content contained in the first meeting window of the electronic meeting.

13. The one or more non-transitory computer readable media of claim 12, further comprising additional instructions which, when processed by the one or more processors, cause:

disabling privileges of the second computing device with respect to privileges to allow control of the second content contained in the second meeting window based upon control administrative privileges held by the computing device.

14. The one or more non-transitory computer readable media of claim 13, further comprising additional instructions which, when processed by the one or more processors, cause:

enabling privileges of the third computing device with respect to privileges to allow control of the second content contained in the second meeting window based upon control administrative privileges held by the computing device.

15. A method comprising:

determining device capability of a computing device with respect to a first meeting window containing first content and a second meeting window containing second content within an electronic meeting;

wherein the electronic meeting is a collaborative meeting between two or more computing devices each concurrently displaying two or more meeting windows that include the first meeting window containing the first content and the second meeting window containing the second content;

determining that the computing device has been assigned, for the first meeting window, a first level role that includes privileges to control the first content contained in the first meeting window of the electronic meeting;

determining that the computing device has been assigned, for the second meeting window, a second level role that includes privileges to view, but not control, the second content contained in the second meeting window of the electronic meeting;

determining, based upon the determined device capability of the computing device with respect to the first meeting window, whether the computing device has the capability to perform one or more functions in the first meeting window required by the first level role;

in response to determining that the computing device has the capability to perform the one or more functions in the first meeting window required by the first level role and that the computing device has been assigned the first level role for the first meeting window, enabling privileges to allow the computing device to control the first content contained in the first meeting window of the electronic meeting;

determining, based upon the determined device capability of the computing device with respect to the second meeting window, whether the computing device has the capability to perform one or more functions in the second meeting window required by the second level role;

in response to determining that the computing device has the capability to perform the one or more functions in the second meeting window required by the second level role and that the computing device has been assigned the second level role for the second meeting window, enabling privileges to allow the computing device to view, but not control, the second content contained in the second meeting window of the electronic meeting;

wherein a second computing device that is different from the computing device that is participating in the electronic meeting has privileges to view, but disallow control, of the first content contained in the first meeting window of the electronic meeting and has privileges to allow control of the second content contained in the second meeting window of the electronic meeting.

16. The method of claim 15, further comprising:

determining that the computing device has, for a third meeting window, a first level role that includes privileges to control the third content contained in the third meeting window of the electronic meeting;

enabling privileges, based upon the device capability with respect to the third meeting window and the determined first level role, to allow control of the third content contained in the third meeting window of the electronic meeting.

17. The method of claim 15, further comprising:

determining that the computing device has, an administrative role that includes privileges to control administrative functions for the two or more meeting windows of the electronic meeting and administrative functions for the electronic meeting;

enabling privileges, based upon the device capability with respect to administrative functions, to allow control administrative functions for the two or more meeting windows of the electronic meeting and administrative functions for the electronic meeting.

18. The method of claim 17, further comprising:

determining device capability of a third computing device with respect to a first meeting window containing first content within an electronic meeting;

determining that the third computing device has, for the first meeting window, a second level role that includes privileges to view, but not control, the first content contained in the first meeting window of the electronic meeting.

19. The method of claim 18, further comprising:

disabling privileges of the second computing device with respect to privileges to allow control of the second content contained in the second meeting window based upon control administrative privileges held by the computing device.

20. The method of claim 19, further comprising:

enabling privileges of the third computing device with respect to privileges to allow control of the second content contained in the second meeting window based upon control administrative privileges held by the computing device.

* * * * *